Patented Sept. 29, 1931

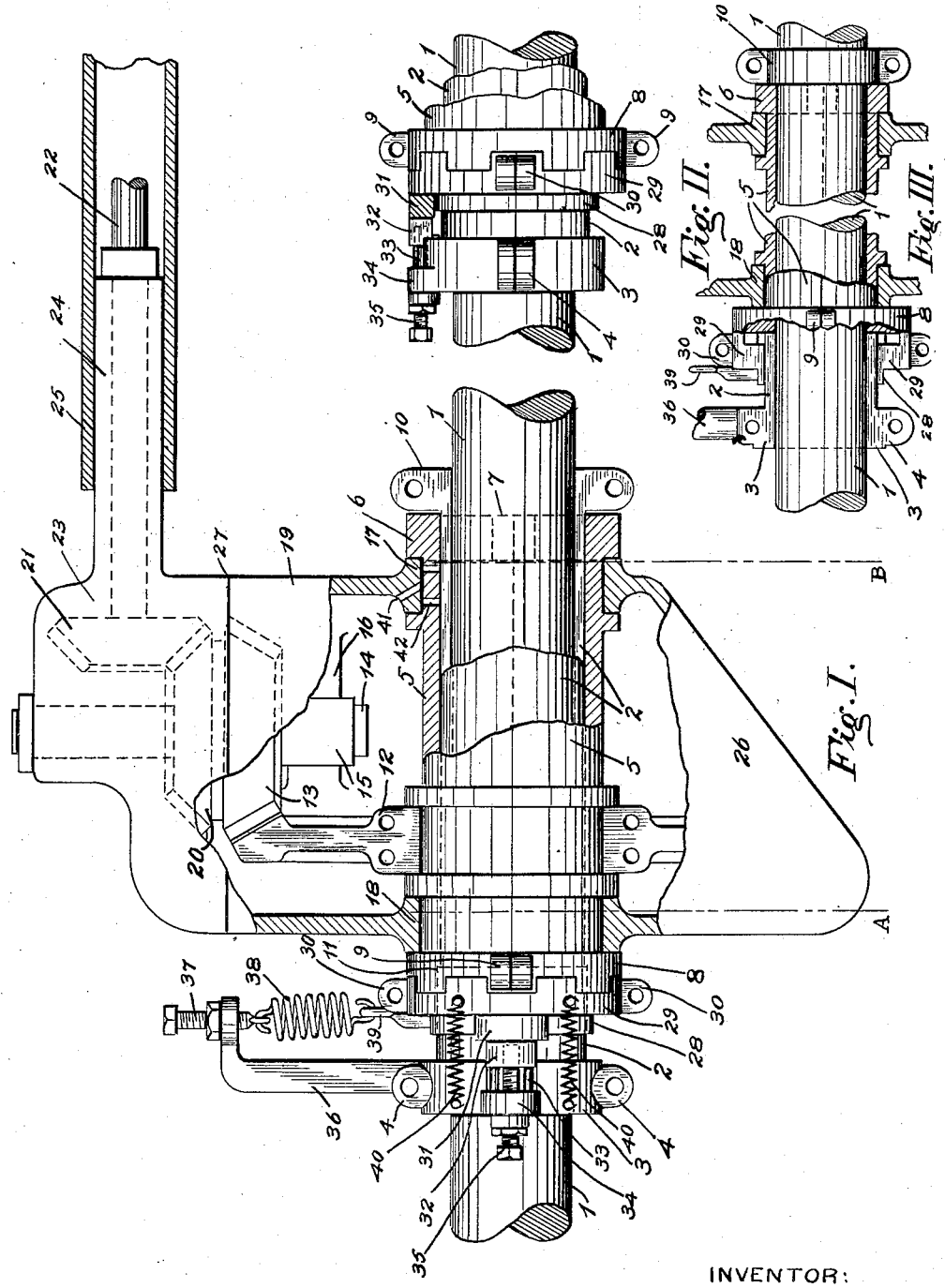

1,825,053

UNITED STATES PATENT OFFICE

JOHN L. CREVELING, OF ORACLE, ARIZONA, ASSIGNOR, BY MESNE ASSIGNMENTS, TO SIMPLEX EQUIPMENT COMPANY, INC., OF NEW YORK, N. Y., A CORPORATION OF DELAWARE

POWER TRANSMITTING MEANS

Application filed June 16, 1924, Serial No. 720,257. Renewed May 2, 1930.

My invention pertains to that class of power transmitting means wherein a driving member is connected to operate a driven member and which members will become automatically disconnected under certain predetermined conditions.

As my invention is particularly applicable to a system wherein the driving member is relatively very powerful and would upon sufficient overload or stoppage of the driven member, by accident or otherwise, be liable to wreck the structure whereby the driving and driven means are connected, it will be described with reference to such a system and, more specifically, with reference to a means for connecting a dynamo with a car-axle, as my invention is particularly useful under the conditions met with in the car-lighting field, as will hereinafter be more fully pointed out.

In the drawings, Fig. I is a partial elevation and partial section of one form of power transmitting means comprehending an embodiment of my invention.

Fig. II is a partial elevation and partial section of a portion of the structure of Fig. I, shown in a different position of operation.

Fig. III is a partial elevation and partial section of a modified structure also comprehending an embodiment of my invention.

Referring particularly to Figs. I and II, 1 indicates a driving shaft, in this instance chosen as a car-axle and, therefore, capable, on account of the enormous weight of a car, of transmitting a great deal of power under certain circumstances to be explained. 2 is a sleeve which is indicated as split and having, at the left-hand end, expanded collar portions 3 provided with bosses 4 for the reception of bolts, not shown, whereby the two halves of the sleeve are clamped upon the axle 1, while the opposite end of the sleeve is provided with expanded portions 10 having similar bosses with bolts therethrough for firmly holding the sleeve 2 in place upon axle so as to revolve therewith. Upon the sleeve 2 there is mounted a split sleeve 5 provided, at its right-hand end, with an expanded portion indicated at 6, this sleeve being shown as split at right-angles to the direction of the split of sleeve 2 when the sleeves are in the positions indicated in the drawings. The expanded portion 6 is provided with bosses, as indicated in dotted lines at 7, through which bolts are passed to clamp the two halves of the sleeve together. The opposite end of the said sleeve 5 is provided with an expanded portion or clutch member 8, and the two halves are held together at this end by bolts passing through bosses as indicated at 9. The sleeve 5 is so bored as to be freely revolvable upon the sleeve 2, while it is restrained from movement in a right-hand direction by the expanded portion 10, and in a left-hand direction by the shoulder upon the sleeve 2, indicated in dotted lines at 11. 12 is a gear mounted upon the sleeve 5 to revolve therewith and, in this instance, is indicated as a split bevel gear, one-half of which has been removed, it being obvious that the two halves may be clamped upon the sleeve 5 by bolts passing through the bolt-holes indicated in the gear 12. While the gear 12 may be connected in any suitable manner so as to operate a driven means, it is, in this instance, indicated, for purpose of illustration, as being connected therewith by a power transmitting means previously invented by me and the subject of a co-pending application, which structure is particularly applicable to this type of power-transmitting means. In this particular type of power transmitting means the bevel gear 12 drives a horizontal bevel gear indicated at 13, free to revolve upon a shaft indicated at 14, carried by a fixed sleeve or collar 15, supported by a heavy web 16 cast integrally with a housing member 19 which rests upon the sleeve 5 as by suitable bearing portions shown in section at 17 and 18. These portions extend half way around the sleeve 5, beginning and ending in a horizontal plane, and are so arranged that the sleeve 5 is free to revolve therein while the position of the shell 19 remains fixed with regard to the sleeve 5, with respect to lateral displacement, in the manner indicated. The gear 13 has attached thereto or formed integrally therewith a bevel gear 20, indicated mostly in dotted lines, engaging a bevel pinion 21 attached to the shaft 22 so as to revolve the said shaft upon revolution of the axle 1. The pinion 21 is carried within the housing 23, provided with an extension or neck 24 through which the shaft 22 passes and within which it is free to revolve in any suitable type of bearings. The extension 24 is indicated as surrounded by a slip tube 25, for a purpose to be explained. 26 indicates a shell or housing for the lower portion of the gear 12 and is provided with bearing portions extending half way around the shaft 1 and forms, with the housing 19, a split housing preferably held together by bolts, not shown, and, with the housing portion 23, entirely encloses the gear mechanism and serves as a receptacle for lubricant whereby the gears are automatically lubricated, and also serves to keep dirt, dust and other foreign matter from interfering with the operation of the gears as well as acting as a "silencer" during high speed operation. The upper portion or shell member 23 is so arranged as to be free to revolve about the shaft 14 and center line of gears 13 and 20, as upon the line 27, and when in operation the housing member 23 and parts connected therewith, including the shaft 22, neck 24 and tube 25, are all revolved substantially 90° from the positions indicated in the drawing, and the shaft 22 thus occupies a position substantially at right-angles to the axle 1. Therefore, when the shaft 22 and the tube 25 are united with a generator or other mechanism to be driven, suitably suspended from the underframing of the car, the said shaft 22 and tube 25 restrain the entire housing from rotating with the axle 1; and, if gear 12 be revolved with the said axle 1, the shaft 22 will drive the generator and the sleeve 5 will revolve within the bearing portions of the housing 19—26. Upon the left-hand portion of the sleeve 2 there is mounted a member comprising the sleeve 28 and the clutch member 29, which is preferably formed in two halves united by bolts passing through the holes shown in the bosses 30. This clutch member is adapted to engage the clutch member 8, as shown in the drawings, and is free to move laterally upon the sleeve 2 except when held into engagement with the member 8 by the action of the block 32 pressing against the block 31 forming a part of the clutch member 29, as shown more plainly in Fig. II in which the portions indicated are shown as revolved 90° from the positions shown in Fig. I and in which a portion of the block 31 is shown in section as the rest thereof is removed for sake of clearness. The block 32 is provided with guides shown in the form of rods at 33 which pass through slip holes in the boss 34 upon the expanded portion 3 of the sleeve 2. 35 is a screw, threaded into the boss 34 and adapted to control the position of the block 32. 36 is an arm carried by the expanded portion 3 of the sleeve 2 and rotating therewith and carries at its upper extremity the tension-adjusting screw 37 engaging one end of the spring 38, the opposite end of which is connected as by member 39 with the clutch member 29. The springs indicated at 40 tend to move the clutch member 29 in a left-hand direction and disengage the clutch member 8, while they are restrained from so doing when the parts occupy the positions indicated in Figs. I and II by the block 32 pressing against the block 31 and holding the clutch members engaged.

An operation of my invention, as illustrated in Figs. I and II, is substantially as follows:

With the shaft 22 and housing 23 revolved, for example, in the neighborhood of 90 degrees towards the observer and restrained from revolution about the axle 1 as when united with a dynamo to drive the same as above described, if the axle 1 be revolved in either direction the sleeve 2 and its expanded portions 3 and 10 and extension 36 will revolve therewith, as they may all be considered as one part, fixed upon the axle. This will cause the clutch member 29 to be revolved with the sleeve 2 through the instrumentality of the spring 38, and the clutch member 29 being engaged with the clutch member 8, as shown, will cause the sleeve 5 to revolve with the axle 1 and sleeve 2. This will cause the bevel gear 12 to revolve, which in turn, by revolving the gears 13—20—21 and shaft 22, will operate the dynamo so long as the same functions properly. If, however, the dynamo armature should become stalled or any accident tend to stop any of the gears connected with the sleeve 5 so as to cause a predetermined over-loading of the spring 38, the same will stretch and allow the sleeve 2 and its expanded portion 3 and the arm 36 to rotate against the spring tension with respect to the clutch member 29; whereupon the block 32 will slide upon the block 31 and after passing the edge of the same in either direction, depending upon the direction of rotation of the axle 1, block 32 will cease to hold the clutch member 29 in engagement with the clutch member 8; whereupon the springs 40 will instantly disconnect the clutch member 29 from the member 8 and allow the sleeve 2 to freely revolve within the sleeve 5 where it will thus continue to revolve freely until the trouble which has caused the driving members to become over-loaded or stopped is removed and the clutch member 29 again caused to engage with the clutch member 8, which is readily accomplished by backing out the screw 35 so that the block 32 no longer interferes with a manual rotation of the clutch member 28—29 upon the sleeve 2 and engagement with the clutch member 8; whereupon the screw 35 may be again caused to push the block 32 into the place shown in the drawings where it will hold the clutch members 29 and 8 engaged until an over-load is again thrown upon the driving spring 38 sufficient to cause it to allow relative displacement enough between 32 and 31 that 32 no longer holds the clutch member 29 in engagement with the clutch member 8; whereupon it will be withdrawn immediately by the springs 40 and all damage due to the sudden over-loading or stoppage of the driven parts prevented. While the sleeve 2 is revolving within the sleeve 5, these parts may be readily lubricated by the oil previously thrown by the revolution of the gear 12 when the same was operating, which oil flowing down the sides of the housing 19 will enter the passages as indicated at 41 and 42. It will be obvious that that portion of the sleeve 2 indicated between the lines A—B or any of the central portion approximating this length may be omitted if desired, and then the sleeve 5 will be supported by such portions of the sleeve 2 as may be left extending within the same; and, by adopting the construction shown in Fig. III wherein like numerals indicate like parts, the sleeve 2 may be omitted entirely, with the exception of that part on the left-hand side of the clutch member 8 which is used for a mounting for the clutch member 29 and also serves to drive the arm 36 and parts connected therewith. With this construction, when the clutch members are disengaged the car-axle 1, instead of the sleeve 2, will revolve within the sleeve 5; and, where a special car-axle is provided, this makes for simplicity, while the structure of Figs. I and II is more suitable where an ordinary axle is used, as the sleeve 2 may be clamped upon a more or less irregular axle by means of shims or bushings, if desired, and when so mounted provides a true cylindrical surface to form a bearing for the sleeve 5. Further, it will be noted that, if desired, at any time, the screw 35 may be backed out and then springs 40 will withdraw the clutch member 29 from the clutch member 8 and leave the sleeve 5 free to revolve upon the sleeve 2 in case one desires to run the generator as a motor for testing purposes, as is often useful in practice; and this will not only show that the motor is operating all right but that the driving gear is functioning properly as well. Then, taking up the screw 35 will again cause the block 32 to press against the block 31 against the action of springs 40 and engage the clutch members in their driving relationship, as shown in the drawings. It will also be obvious that any suitable number of blocks 32—31 and screws 35 may be used, if properly placed, and that a plurality of said sets of blocks will overcome the tendency of canting of the clutch member 29 incident to the use of one set of blocks, shown in the drawings for sake of simplicity.

From the foregoing it will be noted that I have produced a power transmitting means particularly applicable in the art of car-lighting or for use in any environment where it is desirous that the driving means shall be disengaged when an over-load or sudden stoppage of the driven parts takes place, and that while operating in the normal manner the power is transmitted through a resilient connection relieving the driven parts or the driving parts, as the case may be, from sudden strains due to sudden stopping and starting of a driving means which may connect parts possessed of considerable inertia, and, therefore, my power transmitting means relieves the gear teeth as well as the other parts of the driving mechanism of the sudden shocks incident to sudden applications of the car-brakes and skidding of the wheels or the shocks incident to the severe "bumping" that cars suffer during stopping and starting and yard switching. And, it will further be obvious that my invention, while providing a positive driving connection between a car-axle, for example, and a dynamo upon the car, eliminates one of the most serious drawbacks to this type of connection, which resides in the fact that, with any of the usual rigid gear connections with the axle, if any of the bearings of the driven members should happen to heat and "set" or the dynamo armature happen to become stalled, the entire mechanism is apt to be wrecked and cause wrecking of the train, as such a driving structure cannot be made, in practice, sufficiently strong to stop the rotation of the car-axle when the car is in motion; while in my present structure a severe over-load upon the driven mechanism simply causes disengagement of the same from the axle without damage.

I do not in any way limit myself to any of the constructions shown or described or to the exact modes of operation outlined above, for it is obvious that wide departure may be made in the way of construction of the apparatus as well as in the mode of operation without departing from the spirit and scope of my invention which is as set forth in the following claims:

1. The combination with a reversible driving member, a clutch member, resilient means operatively connecting said members, and a second clutch member in positive engagement with said first-named clutch member and driven thereby in a plurality of directions, of means for automatically effecting the disengagement of said clutch members when the load upon said resilient means reaches a predetermined value.

2. The combination with a driving member, a clutch member and resilient means operatively connecting the same, a second clutch member adapted to engage with the first-mentioned clutch member throughout rotation in a plurality of directions and means tending to disengage said clutch members, of means for maintaining said members in engagement throughout a predetermined load upon the resilient means and permitting disengagement of said members when said load is exceeded.

3. The combination with a driving member subject to reversal, a clutch member and means operatively connecting the same and permitting relative displacement therebetween upon changes in load transmitted thereby, and a second clutch member engaged by the first-mentioned clutch member and driven in a plurality of directions thereby, of means causing disengagement of said clutch members when said displacement reaches a predetermined value.

4. The combination with a driving member subject to reversal, a clutch member and means operatively connecting the same and permitting relative displacement therebetween upon changes in load transmitted thereby, a second clutch member engaged by the first-mentioned clutch member, and means tending to disengage said clutch members, of means for maintaining said members engaged throughout reversals in direction of power transmitted and permitting disengagement thereof under predetermined conditions of said displacement.

5. Means for connecting a reversible source of power with power utilizing means, comprehending positively connected members for transmitting power in a plurality of directions and adapted to become automatically disconnected without breakage under predetermined conditions independently of the direction of power transmission, and resilient means directly transmitting the power and determining the conditions of disconnection.

6. Power transmitting means subject to reversal comprehending positively connected means and means for always automatically causing disconnection thereof without breakage under predetermined conditions, comprising resilient means directly carrying the load.

7. Means for connecting a reversible source of power with power utilizing means including positively connected means, means for always automatically causing disconnection thereof without breakage under predetermined conditions of load, and resilient means directly carrying the load determining the conditions.

8. Means for connecting a reversible source of power with power utilizing means including a driving member subject to reversal, a member to be driven thereby in a plurality of directions, intervening power transmitting means connecting the same, including clutch members the engagement of which is alone unaffected by load, automatic means for causing disengagement thereof without breakage under predetermined conditions, and resilient means directly connecting one of said clutch members with the driving member.

9. Power transmitting means comprehending a driving member subject to reversal, a member to be driven thereby in a plurality of directions, intervening power transmitting means connecting the same including clutch members alone incapable of disengagement by load, automatic means for causing disengagement thereof without breakage under predetermined conditions of load and resilient means directly carrying the load.

10. The combination with reversible driving means and means to be driven thereby in a plurality of directions, of intervening power transmitting means comprehending positively connected clutch mechanism adapted to become automatically disengaged without breakage under predetermined conditions regardless of direction of movement of the driving means, including a spring directly carrying the power transmitted and affecting the said conditions.

11. The combination with a driving shaft subject to reversal and means carried thereby to be driven in a plurality of directions including a positively locked connection and a resilient driving connection between the same and said shaft, of means for terminating said locked connection without breakage of the parts upon over-loading of said resilient connection.

12. In apparatus of the class described, means for connecting a driving axle subject to reversal in direction of rotation with a load to be driven thereby, including positively connected clutch mechanism carried by the axle and a power measuring transmission connecting said axle with said clutch mechanism to drive the same in a plurality of directions and adapted to always automatically cause disconnection of said mechanism without breakage upon sufficient overloading.

13. In apparatus of the class described, means for connecting a reversible axle with a load to be driven in a plurality of directions thereby, including positively connected clutch members of which one member is connected with the load by positive driving means and another member is connected with the axle through resilient shock absorbing means directly carrying the load, and means effecting disengagement of the clutch members upon predetermined deformation of the resilient means.

JOHN L. CREVELING.